UNITED STATES PATENT OFFICE.

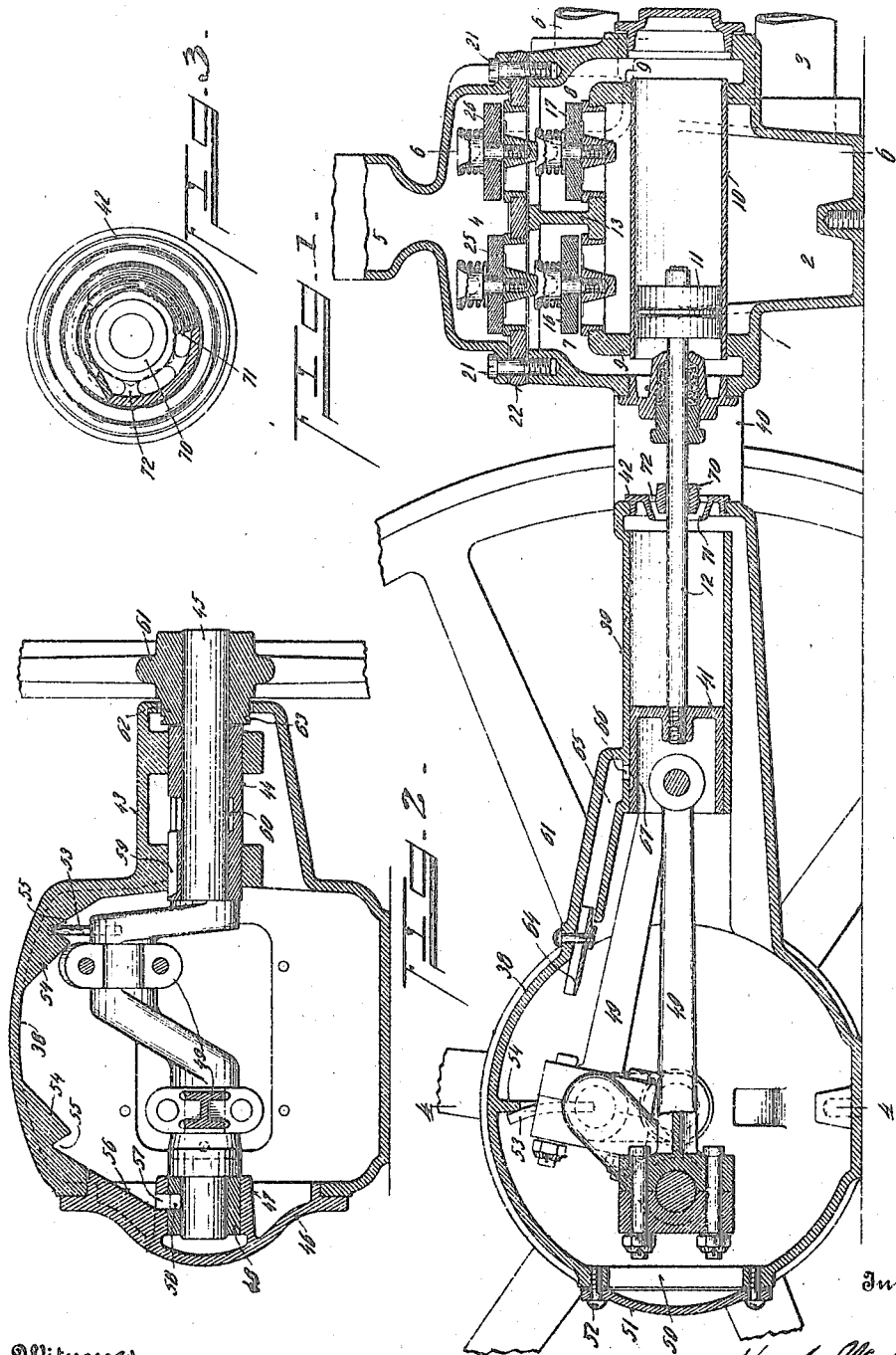

HUGH W. KIMES, OF DAYTON, OHIO, ASSIGNOR TO THE VAILE-KIMES COMPANY, OF DAYTON, OHIO, A CORPORATION OF OHIO.

PUMPING APPARATUS.

1,232,932.            Specification of Letters Patent.    Patented July 10, 1917.

Application filed April 8, 1916. Serial No. 89,764.

*To all whom it may concern:*

Be it known that I, HUGH W. KIMES, a citizen of the United States, and residing at Dayton, in the county of Montgomery and State of Ohio, have invented a new and useful Improvement in Pumping Apparatus, of which the following specification is a full disclosure.

My invention relates to pumping apparatus particularly adapted for use in connection with domestic water supply systems. These systems are frequently installed by laymen who have no regard for defined rules in plumbing and hydraulics, or neglect to carefully follow instructions, and after installation the appliances are usually wanting for attention.

The success of the equipment therefore depends upon the simplicity of the structures, arranged to avoid errors in installation and in which the mechanism can operate efficiently for long periods without need of attention. The pumps usually are motor-operated under automatic control, for pumping the water from a source into a compression tank when it is delivered to the fixtures at the place of utilization.

Another object of the invention is to unitarily combine a pump and transmission mechanism therefor in which the transmission devices are inclosed and housed in a casing with the casing providing a reservoir for a lubricant and lubricating drainage system, for distributing the lubricant to the various moving parts within the casing, and further, in providing one of the rotating or moving parts with means adapted while in motion to carry and distribute the lubricant from a supply source at a lower elevation to higher elevations from which it drains by gravity to various points with the surplus returned to the source of supply.

Another object of the invention is to provide means for preventing any fluid leakage or accumulation collecting upon the pump piston rod from being conveyed thereon and into the transmission casing, which causes displacement of the lubricant in the casing reservoir.

Further objects and features of the invention, some of which relate to details of construction, will be more fully disclosed in the description of the accompanying drawings illustrating a preferred embodiment of the invention, and in such drawings like characters of reference denote corresponding parts throughout the several views, of which:—

Figure 1 is a central vertical section through a duplex pump and driving mechanism containing my improvements. Fig. 2 is a section on line 4—4, Fig. 3. Fig. 3 is an enlarged detail plan view, partly in section, of a piston rod wiper bonnet concentrically disposed over the piston rod at the head of the crank case.

The casing for supporting the pump transmission devices is shown as integral with the pump casing although the casing may be non-integral and bolted together. As the details of the pump construction are not material to the invention herein, which only includes the pump piston in combination as to certain aspects, the pump parts will be generally referred to and only to the extent of the parts shown in the drawings.

The pump may be of a design following well known principles and in particular of a construction as shown and described in a prior patent issued to me December 28, 1915, No. 1,166,224, in either single or duplex type.

The features of the invention herein embrace either the single or duplex type although illustrated for a duplex.

Referring to the pump, 1 indicates the casing having an inlet chamber 2 which communicates with a water supply source and a discharge chamber 4 and air chamber 5. 6 indicates a discharge line communicating with the discharge chamber 4. Interposed between the two chambers are conduits or valve chambers 7 and 8 partially formed by the partitions 9. A pump cylinder 10 is mounted in the partitions 9 with open ends communicating with the conduits or chambers 7 and 8 respectively. Mounted in the cylinder is a piston 11 having connected therewith a piston rod 12.

The chambers 7 and 8 are separated, one from the other, by a vertical partition 13, and the chambers respectively communicate with the inlet chamber 2 through the ports 14 and 15, which ports are controlled by yieldable valves 16 and 17.

The upper part of the pump casing which contains the discharge chamber 4 is formed separately from the remainder of the casing and is secured thereto by bolts or screws 21. The chamber 4 is separated from the chambers 7 and 8 by a horizontal partition plate 22 and the partition plate is provided with ports controlled by the valves 25 and 26.

Crank case.

A casing 38 supports and completely houses the crank devices for operating the pump pistons. The case serves as an oil reservoir for lubricating purposes, with some of the parts operating in a bath of oil, while to others the oil is constantly fed when the parts are in motion, providing a system of lubrication requiring no attention further than to maintain the proper supply of oil within the crank case. The casing 38 has a circular portion within which the crank shaft rotates, and a longitudinal cylinder portion 39 within the cross-head of the piston slides. The crank casing is shown in Fig. 3 as integrally connecting with the pump casing 1 by the webs 40 for unitarily combining the pump and crank mechanism for maintaining the alinement between the several parts and furnishing other advantages for manufacturing and installing.

The pump being of duplex type, the casing is provided with two cylinders 39 adjacently parallel, each having a piston cross-head 41 slidable therein and connecting with its respective piston rod 12 to the pump piston 11. The crank casing at such cylindrical portions has its base inclined downwardly for oil drainage purposes to return the oil from the cylinders to its reservoir supply in the crank housing portion of the casing. At the rear end of each of the cylinders 39 an opening is provided in the crank case into which a wiper bonnet 42 is screw-threaded, concentric with the piston rod, which will be hereinafter more fully described.

At one side of the casing a hub journal bearing 43 integrally projects therefrom interiorly webbed and bored to receive the bearing bushing 44 concentric with the axial portion of the crank shaft 45. The casing at the side opposite the bearing extension 43, is provided with an opening for inserting and removing the shaft. A bearing closure 46 is secured to the casing for sealing said side opening, which has an inwardly projecting hub portion 47 receiving a bushing 48 for supporting and journaling the opposite end of the crank shaft 45. A pitman 49 connects with the crank shaft and a respective piston cross-head, one being provided for each pump piston. The end of the casing is provided with an opening 50 and a closure plate 51 therefor secured to the casing by screws 52. This opening furnishes access to the pitman and for boring the cross-head cylinders.

Lubrication.

A self-oiling and drainage system of lubrication is provided for distributing the oil to all of the moving parts of the transmission mechanism taking the supply from the reservoir and draining the surplus back to the reservoir. A wiper stem 53 projects from each of the crank arms of the crank shaft 45, which is made of flexible material as leather or packing, which dips into the reservoir, taking up a supply of oil with each rotation of the crank shaft and deposits the oil upon a web 54 dependingly projecting from the upper portion of the casing and preferably in central alinement with the axis of the crank shaft. As shown in Fig. 4 the web is of a particular outline with a downwardly tapering edge and a central V-notch 55 between which the oiling stem 53 passes.

As the oil is deposited upon the web 54 of either side of the crank case, duplicate construction being followed out from both sides, the oil flows down the web by gravity to the crank shaft axis or axle studs for lubricating the ends of the shaft in its bearings. As the closure plate 46 forms a part of the casing of one side, the plate has a downwardly inclined rib 56 on the interior thereof, leading to the aperture 57 in the bearing hub 47. The bushing 48 has an aperture 58 registering with the aperture 57 of the hub extension 47, with the apertures forming a pocket for the oil flowing down the crank case for lubricating the crank shaft in its bearing in the closure plate 46. At the opposite side of the casing the oil flows downwardly into the longitudinal groove 59 formed in the bushing 44. This groove 59 communicates with a central annular groove 60 formed in the bushing 44 surrounding the crank shaft 45, and provides a pocket for oil for such shaft end bearing.

A pulley 61 is shown fixed upon the crank shaft adjacent the hub bearing extension of the casing for rotating the shaft. The pulley has its hub of slightly elongated form to project a slight distance into the casing, and the hub 62 has an annular groove 63 toward its end and within the casing to provide an oil channel for preventing oil from passing outwardly upon the hub beyond the casing. This construction avoids any outward oozing tendency of the oil beyond the crank case, and serves as a shed for directing the oil downwardly upon the lower inclined surface of the base of the hub extension. It also avoids the necessity of any packing or stuffing box construction and furnishes a free open end in the casing through which the hub of the pulley projects.

The stems 53 in their orbit engage against a wiper plate 64 fixed to the upper wall of the casing as shown in Fig. 3, and which provides an inclined channel communicating with the passage 65 formed in said casing for distributing oil to the piston crossheads. The passage 65 communicates with the cylindrical portion 39 of the casing through a port 66 at one end of the cylinders 39 to feed the oil to the piston crossheads 41. The piston cross-head has an aperture 67 therein diametrically disposed to the axis of the pitman crank pin connecting with the piston cross-head, which aperture in the sliding motions of the cross-head comes in registry with the port 66 to partake of a supply of oil with each piston stroke and direct the same downwardly upon the pitman pin for lubricating the pitman at its fulcrum connection with the cross-head.

It will be observed that the end of the cylinder 39 toward the pump terminates in a spaced relation from the end of the crank case for preventing the surplus oil in the cylinder from being deposited on the end of the crank case, which would have a tendency to ooze or spill out and become lost. The surplus oil in the cylinder thus is directed upon the inclined longitudinal base portion of the casing which drains toward the reservoir.

From the foregoing it will readily be apparent that all of the moving parts are constantly furnished with a supply of oil to maintain the same under perfect lubrication and requiring no attention other than to keep a supply of oil within the reservoir.

The reservoir is of the capacity sufficient for a six months or more supply of oil and the wiper stems are of a proportion which will take up the quantity of oil ample for the requirements and without causing any undue agitation of the oil, and as the motion of the crank shaft is rather slow, the quality of the oil will not be injured by agitation.

Any seepage or percolation of water through the stuffing box at the pump piston rod is apt to collect upon and be carried by the piston rod into the crank case, and if permitted to accumulate in the crank case will gradually displace the oil therein. Water is also adapted to adhere in minute quantities upon the moving piston rod and pass therewith through the stuffing box of the pump or crank case to be conveyed to the opposite end of the piston rod which moves within the crank case and after its accumulation is sufficient will drop by gravity from the rod into the crank case. To avoid such accumulation of water on the rod within the crank case, I provide the end of the case with a bonnet 42, which qualifies as a wiper for the piston rod and a shed for draining the water outwardly against deposit into the casing. In the preferred arrangement, the bonnet is removable from the end of the crank case for a manufacturing facility, and in detail is provided with a hub or sleeve portion 70 concentrically fitting the piston rod, but for the purposes herein, may be free from frictional contact therewith. An annular conical flange 71 projects from one side of the bonnet coaxially with the hub and terminates beyond the end of the hub. The bonnet is fitted into the end of the casing to project the flange into the casing shedding the water outwardly as it is wiped from the piston rod and collected at both ends of the hub, and thereby prevents it from being deposited within the casing. The hub connects integrally with the gland portion of the bonnet by spaced webs 72 as shown in Fig. 5, with the spacing between the webs providing ports or passages therethrough. The conical flange as a shed for the deflecting of water on the piston rod to drain extensions of the casing also serves as a guard for draining the oil splashing from the piston cross-head back into the casing. The bore of the hub may be lined with a Babbitt or other soft metal but this is not necessary when the bore surface is free from frictional contact with the piston rod, and thus will not add any friction load to the moving parts.

Having described the invention, I claim:—

1. In a device of the class described, a pump casing and cylinder, a piston mounted in the cylinder, a piston rod connecting with said piston and slidably projecting through the casing, a transmission casing crank and pitman devices mounted in said transmission casing and connecting with said piston rod, and means engaged into the transmission casing concentrically about said piston rod, adapted to scour or skim said rod and having a shed to drain the collected accumulation from the piston rod to the exterior of transmission casing.

2. The combination of a cylinder, a piston movable within the cylinder, a crank case, crank transmission devices mounted in said case, a piston rod connecting said crank devices and piston, and a member supported concentrically about said piston rod between the piston and crank devices and having an inclined shed for collecting and draining any accumulated deposit from said rod to the exterior of said crank case.

3. The combination with a reciprocating piston and piston rod connected therewith, a transmission casing providing an oil reservoir, transmission devices in said casing, a bonnet member supported upon said casing concentrically about said rod and free from contact therewith for collecting any fluid deposit on said rod and shedding the same from the transmission casing.

4. In a pump, a casing and cylinder, a piston movable in said cylinder, a piston rod connecting with said piston and projecting through the head of the cylinder, a sleeve member supported in the casing exterior of and beyond the head of the cylinder and concentric with the piston rod to deterge said rod of cylinder escaping fluid deposited upon and conveyed by said rod, and an inclined flange concentric with said member, spaced therefrom and projecting beyond one end thereof.

5. A device of the nature disclosed comprising a gland member having a bored hub portion for embracing a rod passing through the bore, and an inclined shed portion about said hub portion extended to project beyond one end of said hub portion.

6. A casing providing a support and housing for crank transmission devices, comprising a cylindrical casing shaft housing portion with shaft supporting side walls, a second cylindrical portion extending radially from said first-named cylindrical portion and provided with an open end and a gland member as a closure for said open end provided with a hub portion coaxial with said cylindrical portion, and an inclined baffle extending concentrically spaced from said hub portion.

7. A casing providing a support and housing for crank transmission devices, comprising a cylindrical casing portion having an opening at one end and a hollow bearing extending from the opposite end, a bearing closure member for said open end, a cylindrical portion longitudinally radially projecting from said first cylindrical portion, and having an open end and an apertured baffle gland member as a closure for said end opening.

8. A casing providing a support and reservoir housing for crank transmission devices, comprising a cylindrical casing portion having an end opening longitudinally providing a cylindrical slide support and a base surface inclined downwardly toward said first casing portion and spaced from said cylindrical slide support and an apertured baffle gland as a closure for said end opening.

9. A transmission device of the class described, a casing providing a support and reservoir housing having a cylindrical casing portion with journal bearing ends, a second longitudinal casing portion radially projecting from the first casing portion interiorly longitudinally providing a slide support and oil drainage base surface inclined downwardly toward the base of said first-named casing portion, said longitudinal casing portion also provided with an oil drainage passage communicating with the chambers formed by said casing portions, a crank shaft journaled in said bearing ends, an oil carrying member mounted upon and revolving with said shaft for conveying oil contained in the base of the first casing portion to said passage, and a baffle gland as a closure for said end opening of said longitudinal casing portion.

10. In a device of the class described, a closed crank casing having journal bearings at opposite ends, the upper wall of said casing interiorly provided with a rib axially alined with the bearings, a crank shaft journaled in said bearings, and a flexible stem secured to and projecting from said crank shaft adapted in the crank shaft rotation to strike said rib for carrying and conveying oil from the base of the crank case to the rib.

11. In a device of the class described, a closed crank casing having journal bearings at opposite ends, the upper wall of said casing interiorly provided with a rib alined over the bearings, a crank shaft journaled in said bearings, and a fibrous stem secured to and projecting from said crank shaft adapted in the shaft rotation to dip oil from the base of the casing and deposit the same upon said rib, for feeding the lubricant by gravity to said bearings.

12. In a device of the class described, a closed crank casing, a crank shaft journaled in said casing having a yielding stem projected therefrom adapted with the shaft rotation to carry a liquid lubricant from the base of the casing and deposit the same to lubricant draining surfaces projecting in the path of said stem for distributing the lubricant to various points within the casing by gravity.

In witness whereof, I hereunto subscribe my name, as attested by the two subscribing witnesses.

HUGH W. KIMES.

Witnesses:
 A. P. POTTLE,
 E. H. BESCHER.